No. 727,003. PATENTED MAY 5, 1903.
P. J. SHOUVLIN.
CLUTCH.
APPLICATION FILED JUNE 26, 1901.

NO MODEL. 2 SHEETS—SHEET 1.

WITNESSES: INVENTOR.

No. 727,003. PATENTED MAY 5, 1903.
P. J. SHOUVLIN.
CLUTCH.
APPLICATION FILED JUNE 26, 1901.
NO MODEL. 2 SHEETS—SHEET 2.

No. 727,003. Patented May 5, 1903.

UNITED STATES PATENT OFFICE.

PATRICK J. SHOUVLIN, OF SPRINGFIELD, OHIO.

CLUTCH.

SPECIFICATION forming part of Letters Patent No. 727,003, dated May 5, 1903.

Application filed June 26, 1901. Serial No. 66,049. (No model.)

*To all whom it may concern:*

Be it known that I, PATRICK J. SHOUVLIN, a citizen of the United States, residing at Springfield, in the county of Clark and State of Ohio, have invented certain new and useful Improvements in Clutches, of which the following is a specification, reference being had therein to the accompanying drawings.

This invention relates to clutches, and has for its primary object to equalize and reduce the strains to which devices of this kind are subjected.

The invention has for a further object to provide an operating mechanism for the shoes or friction-clutches which shall be strong and efficient as well as simple and which will effectually prevent slipping.

To these and other ends my invention consists in certain novel features, which I will now proceed to describe and will then particularly point out in the claims.

Figure 1:
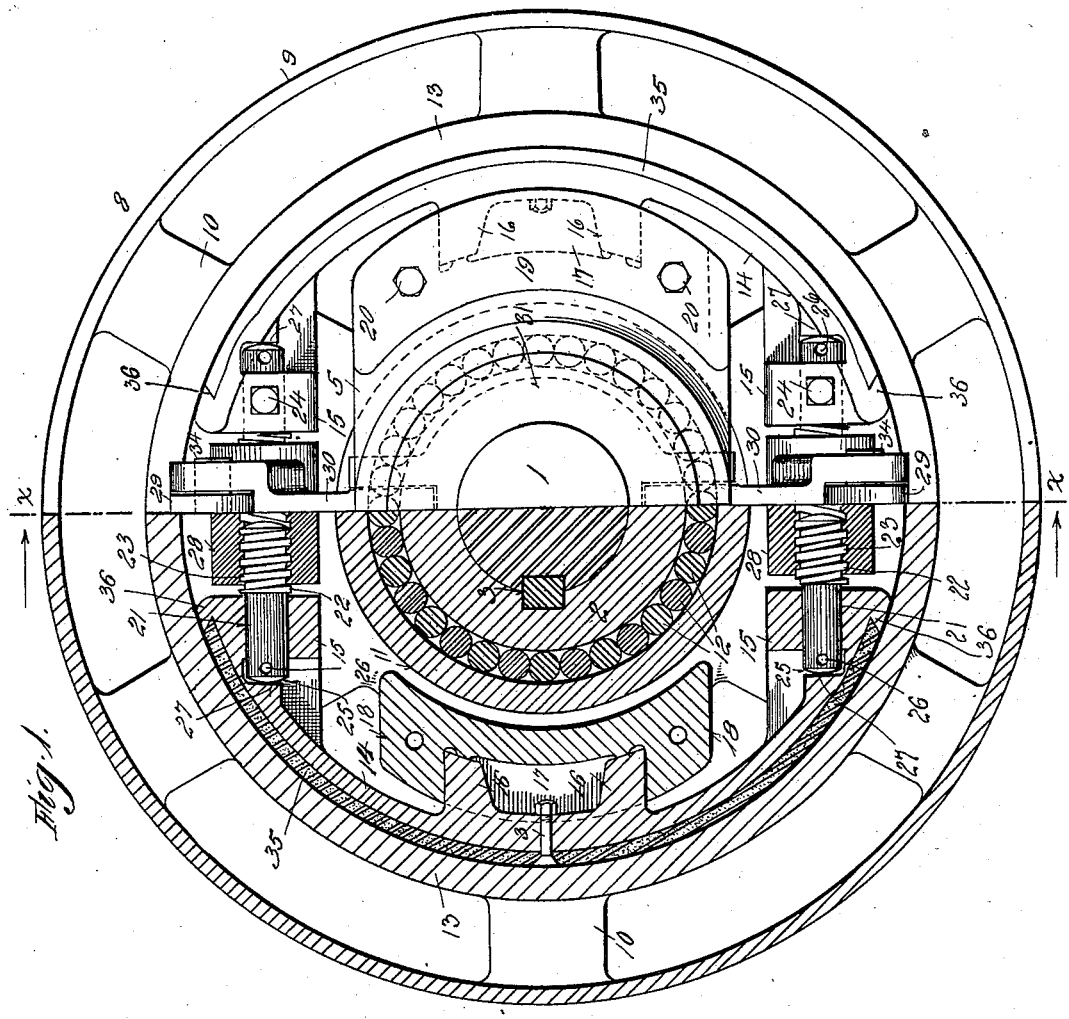
Figure 2:
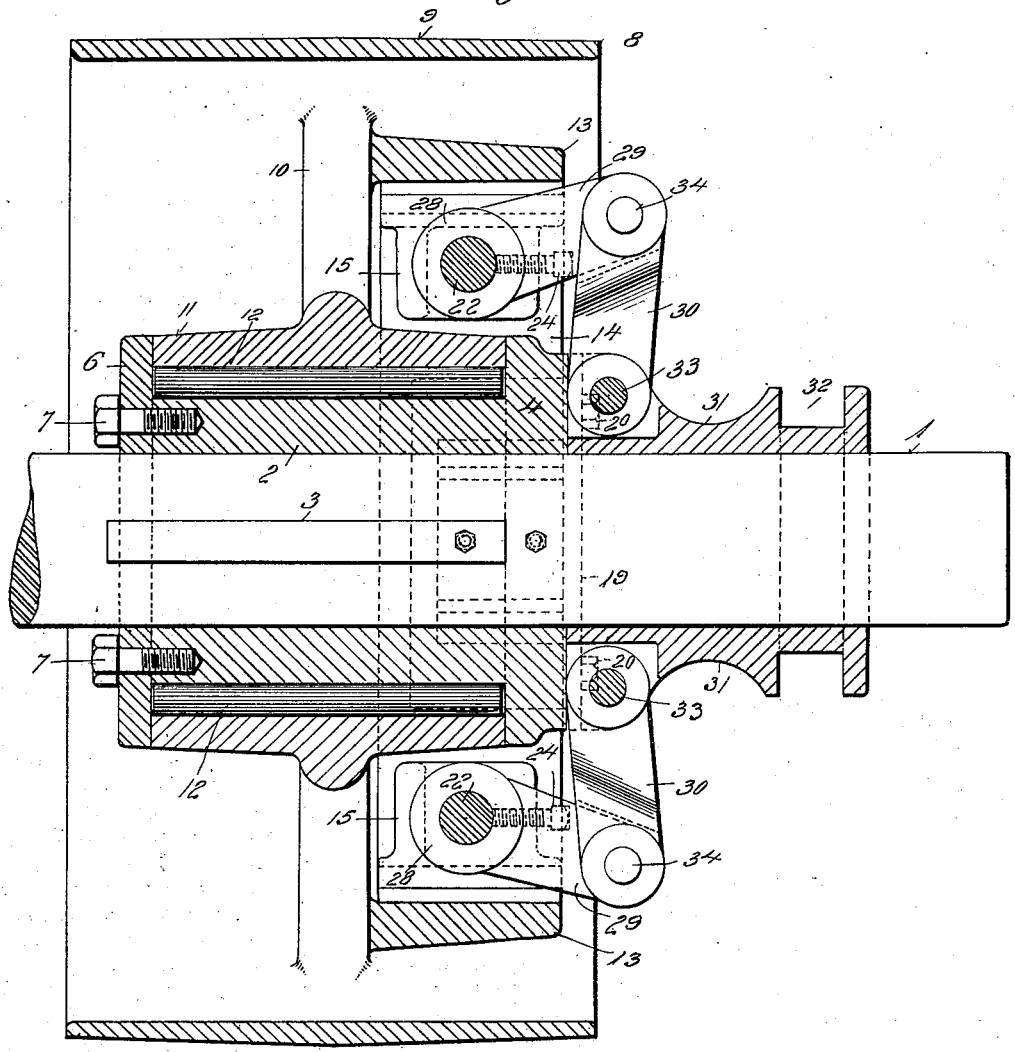

In the accompanying drawings, Figure 1 is an elevation, one-half in section, of a clutch embodying my invention in one form; and Fig. 2 is a sectional view taken on the line $x$ $x$ of Fig. 1 and looking in the direction of the arrows.

The particular embodiment of my invention which I have chosen for purposes of illustration is a form of clutch devised by me for use in connection with a gas-engine as a motive power and is employed to drive a belt, which in turn drives a pulley of very large diameter used in the oil regions for pumping. The strain transmitted through this belt to the clutch is very great and is at times much greater than the normal, and I have found in practice that clutchs of ordinary construction not only cut into their bearing-surfaces under the strain of the belt, thus causing the pulley to run untrue and tend to engage with and wear the shoe when the clutch should be running free, but I have also found that where the two members of the clutch were located laterally with respect to each other on the shaft there is a tendency to cut into the shaft at one point of its length more than at another, thus further cutting the clutch out of true. It is chiefly to avoid these difficulties that I have devised the construction shown in the accompanying drawings and which I will now proceed to describe.

In the said drawings, 1 indicates the shaft, which in this instance may be considered as a driven shaft, and, more specifically, the engine-shaft. Upon this shaft is keyed a sleeve-like hub 2, the key being indicated at 3. This hub is provided at one end with a head 4, preferably integral, which carries the spider 5, hereinafter to be referred to more in detail, on which the engaging devices of the clutch are mounted. The opposite end of the sleeve or hub 2 is provided with an annular head 6, secured thereto by screw-bolts 7 or in any other suitable manner.

8 indicates the pulley from which in the present instance the power is to be taken by a suitable belt. This pulley consists, preferably, of a rim 9 and spokes 10 and is provided with a sleeve-like hub 11, which fits between the heads 4 and 6 of the sleeve-like hub 2, secured on the shaft 1. The bore of the hub 11 is considerably greater than the outer diameter of the sleeve 2, and the space between the two is filled by a plurality of antifriction-rollers 12, which fit between the two adjacent surfaces—to wit, the outer surface of the sleeve 2 and the inner surface of the sleeve 11—and whose end motion is limited by the heads 4 and 6, as shown. It will be noted that the central transverse plane of the pulley is substantially coincident with the central transverse plane of the sleeve or hub 2, secured on the main shaft, so that the bearing of the hub of the pulley upon said sleeve is substantially equal on all parts thereof. It will further be noted that the sleeve 2, secured on the shaft, is interposed between said shaft and the hub of the pulley, so that the shaft is protected from wear, and any wear which would otherwise fall upon the shaft by reason of the mounting of the pulley directly upon it falls upon the sleeve or hub of the spider. This is important, for the reason that where the shaft is an engine-shaft it is an expensive part to replace, whereas the spider and its sleeve or hub may be readily replaced at a comparatively small cost. The wear is, however, exceedingly slight, owing to the employment of the antifriction-rollers, and is so equalized and distributed, owing to the employment of said rollers and the relative position of the pulley and sleeve, that it does not affect the true running of the clutch.

The particular type of clutch in which I have shown my invention embodied is what is known as a "friction-clutch," and while the friction-shoes might be caused to engage directly with the rim of the pulley I prefer to provide the pulley with a separate friction-rim 13, located within the rim 9 and secured to or formed on the spokes 10. With this friction-rim I employ two coöperating shoes, each consisting of a body portion 14, formed in the arc of a circle and extending almost through a semicircle, so that their corresponding ends are separated by a comparatively short distance and stand opposite each other. Each shoe 14 terminates at each end in a head 15 and is provided at its central portion with driving-lugs 16, extending inward and engaging in a recess 17 on a rearward projection 18, formed on the spider 5. It will be understood, of course, that there is one of these projections at each end of the spider, and said spider is provided at each end outside of said recess with a covering-plate 19, secured by screw-bolts 20 or in any other suitable manner. By reason of this construction motion is imparted from the spider to the shoes 14, so as to cause these latter to rotate along with the shaft 1.

Each head 15 is provided with a bearing 21 for a screw-shaft 22, which is unthreaded as to that portion which lies within the bearing 16, its outwardly-extended portion, extending toward the opposite head 15, being threaded, as indicated at 23. Each screw-shaft 22 is normally held stationary by a set-screw 24, passing through the head 15, but can be rotated in its bearing 21, said bearing being slotted, as indicated at 25, to give access to the end of the shaft 22, which is provided with apertures 26 to receive the end of a pin or other suitable tool for this purpose. The inner end of the shaft 22 abuts against a shoulder 27, which forms an end bearing to prevent longitudinal movement of the shaft when rotated. As hereinbefore stated, each of the four heads at the ends of the two shoes is similarly provided with a similar shaft 22, so that at each side of the device there are two of these shafts extending toward and in line with each other, and said shafts are so constructed that their threads 23 run in opposite directions or, in other words, are right and left threads with respect to each other. At each side of the device I employ a sleeve 28, the ends of which are oppositely threaded to fit upon the adjacent threaded portions of the shafts 22, which enter said sleeve and which by the rotation of said sleeve may be caused to move toward or from each other. Each sleeve 28 is provided with an arm 29, connected by a pivoted link 30 with a collar 31, sliding on the shaft 1 and having a groove 32 to receive a suitable loose collar or the end of a forked lever or other similar device usually employed in clutches of this character to move the collar 31 longitudinally on the shaft 1, along with which it rotates.

It will be seen that longitudinal movement of the collar 31 on the shaft 1 will through the links 30 and arms 29 rock the sleeves 28, and through the engagement of these latter with the threaded portions of the shafts 22 the shoes 14 will be forced away from each other or drawn toward each other by means of power applied between their two pairs of abutting ends. The power thus exerted is manifestly very great and is sufficient to hold the shoes firmly in engagement with the friction-rim 13, thereby preventing any slipping of the clutch. It will be observed in this connection that the pins 33, which form the pivotal connections between the links 30 and collar 31, are permitted to pass inward beyond the line connecting the pivots 34, which connect the links 30 with the arms 29, and when the parts are in this position the shoes are firmly held in engagement with the rim 13, and a positive force is required to disengage said shoes from the rim. It will also be observed that by turning the shafts 22 through the medium of the construction provided for that purpose the shoes may be adjusted toward or from each other and toward or from the rim, and this adjustment may be effected with great nicety and may be rendered permanent by means of the set-screws 24.

I preferably provide each shoe with a facing 35, preferably of a fibrous material, such as vulcanized or indurated fiber, and as an efficient means for securing this facing in place I provide at each end of the shoe a beveled lip 36, under which the end of the facing extends, and employ at the central part of the casing one or more countersunk screw-bolts 27, which, in conjunction with the lips 36, serve to hold the facing in place.

A special advantage of my improved roller-bearing construction for clutches is that where a very great strain is placed upon the device by reason of an excessive tension of the belt it is difficult to start the engine, owing to the large amount of surface in frictional contact where ordinary bearings are employed, and this is particularly true where a gas-engine is employed. With my improved construction the friction is so reduced that the engine may be readily started when the clutch is under severe belt strain.

It is obvious that instead of being applied to a pulley my invention is equally applicable to a gear-wheel and that the power may be applied to said pulley or wheel instead of to the shaft. Moreover, some portions of my invention may be employed in a given structure without involving the necessity of employing all of the novel features hereinbefore specified. I therefore do not wish to be understood as limiting myself to the precise details of construction hereinbefore described and shown in the accompanying drawings, as these details may obviously be modified without departing from the principle of my invention.

Having thus fully described my invention, what I claim as new, and desire to secure by Letters Patent, is—

1. In a clutch, a shaft, a spider carrying engaging devices and having a sleeve-like hub secured on the shaft, and a pulley or the like loosely mounted on said sleeve-like hub in a substantially central position relatively thereto and adapted to be engaged by the engaging devices on the spider, the shaft-hub and pulley-hub having substantially coextensive bearing-surfaces throughout their length located equally on opposite sides of the central transverse plane thereof, substantially as described.

2. In a clutch, a shaft, a spider carrying engaging devices and provided with a sleeve-like hub secured on the shaft, a pulley or the like loosely mounted on said sleeve-like hub in a substantially central position relatively thereto and adapted to be engaged by the engaging devices on the spider, and antifriction-rollers interposed between the pulley and said sleeve-like hub, and arranged to form equal bearings on the opposite sides of the central transverse plane of the pulley and hub, substantially as described.

3. In a clutch, a shaft, a spider carrying engaging devices and provided with a sleeve-like hub secured on the shaft and having heads at its ends, one of which is removable, a pulley or the like centrally located with respect to said sleeve-like hub, adapted to be engaged by the engaging devices of the spider, and having a hub loosely surrounding said sleeve-like hub and fitting between the heads thereof, and antifriction-rollers filling the space between the pulley-hub and the sleeve-like hub of the spider, the heads of the latter forming end stops for said rollers, substantially as described.

4. In a clutch, a normally loose pulley provided with a friction-rim, in combination with a shaft, a spider secured thereon, a pair of friction-shoes, each slightly less than semicircular in form and adapted to slide radially on the spider, the adjacent ends of the shoes being each provided with a cylindrical bearing and an end bearing or abutment, normally fixed right and left threaded shafts mounted in said cylindrical bearings and abutting against said end bearings, means for securing said shafts against rotation in said cylindrical bearings, correspondingly-threaded sleeves at each end within which the threaded ends of said shafts extend, and means for rotating said sleeves to move the shoes toward and from the friction-rim, substantially as described.

5. In a clutch, the combination, with a normally loose pulley provided with a friction-rim, of a shaft, a spider secured thereon, a friction-shoe sliding radially on the spider and provided with a head having a cylindrical bearing and an end bearing, a shaft mounted to rotate in said first-mentioned bearing and abutting against said second-mentioned bearing, said shaft having a projecting threaded portion, means for normally preventing rotation of said shaft, a sleeve threaded to receive the projecting end of said shaft, and means for rotating said sleeve to move the shoe toward or from the friction-rim, said last-mentioned means also serving to hold the sleeve stationary when the shaft is rotated to adjust the shoe relatively to the sleeve and rim, substantially as described.

6. In a friction-clutch, the combination, with a normally loose pulley provided with a friction-rim, of a shaft, a spider secured thereon and having at each end a projection provided with extended parallel, lateral bearing or guiding surfaces, shoes located at the opposite ends of said spiders and having at their central portions extended parallel, lateral bearing-surfaces engaging the corresponding surfaces of the spider, whereby the shoes are supported and guided so as to move in right lines, said shoes being approximately semicircular in form, right and left threaded screw-shafts and sleeves connecting the abutting ends of the opposite shoes to move them toward and from the friction-rim, and pivotally-connected means for actuating said threaded devices, substantially as described.

7. In a friction-clutch, the combination, with a normally loose pulley provided with a friction-rim, of a shaft, a spider secured thereon and having oppositely-extending radial arms provided at their extremities with lateral projections parallel with the shaft, and having formed in their outer faces recesses having parallel, lateral guiding-walls, a pair of friction-shoes, slightly less than semicircular in form and provided with inwardly-extending projections having parallel, lateral guiding-surfaces to engage the corresponding surfaces of the spider projections, whereby the shoes are positively guided to move in straight lines, the opposite abutting ends of the two shoes being provided with normally fixed threaded shafts extending toward and in line with each other, each pair of shafts having respectively right and left threads, a right and left threaded sleeve at each side of the spider with which the corresponding shafts engage in pairs, each sleeve being provided with a projecting arm, a collar sliding longitudinally on the shaft, and pivoted links connecting the sleeve-arms and collar, substantially as described.

In testimony whereof I affix my signature in presence of two witnesses.

PATRICK J. SHOUVLIN.

Witnesses:
IRVINE MILLER,
WM. O'LAUGHLIN.